United States Patent [19]

Turnbull

[11] Patent Number: 5,723,047
[45] Date of Patent: Mar. 3, 1998

[54] COMPRESSIBLE FILTER ELEMENT PERIPHERALLY SEALED BY A SETTABLE MATERIAL

[75] Inventor: Christopher Stratton Turnbull, Hythe, England

[73] Assignee: Smiths Industries Public Limited Co.

[21] Appl. No.: 734,850

[22] Filed: Oct. 23, 1996

[30] Foreign Application Priority Data

Nov. 9, 1995 [GB] United Kingdom .................. 9522999

[51] Int. Cl.⁶ ............................................ B01D 27/08
[52] U.S. Cl. ............... 210/445; 210/451; 210/455; 210/489; 55/502; 55/503; 55/511; 55/DIG. 39
[58] Field of Search ............... 55/502, 503, DIG. 39, 55/511; 210/435, 445, 446, 447, 450, 451, 453, 455, 488, 489

[56] References Cited

U.S. PATENT DOCUMENTS

| | | |
|---|---|---|
| 3,954,625 | 5/1976 | Michalski . |
| 4,113,627 | 9/1978 | Leason . |
| 4,283,289 | 8/1981 | Meyst et al. ............................. 210/450 |
| 4,414,172 | 11/1983 | Leason . |
| 5,178,760 | 1/1993 | Solberg, Jr. ............................. 55/503 |
| 5,221,573 | 6/1993 | Baigas, Jr. ............................. 55/DIG. 39 |
| 5,273,724 | 12/1993 | Bos ............................. 55/503 |
| 5,478,377 | 12/1995 | Scavnicky et al. . |
| 5,503,742 | 4/1996 | Farley ............................. 210/446 |
| 5,556,541 | 9/1996 | Ruschke ............................. 210/445 |

FOREIGN PATENT DOCUMENTS

| | | |
|---|---|---|
| 0 309 277 | 3/1989 | European Pat. Off. . |
| 2223423 | 4/1990 | United Kingdom . |

*Primary Examiner*—W. L. Walker
*Attorney, Agent, or Firm*—Pollock, Vande Sande & Priddy

[57] ABSTRACT

A filter has a series of porous, compressible filter elements sealed at their outer edge by a collar of silicone rubber that is flowed into the filter elements. The collar seals with an annular recess around the inside of a filter housing so that flow through the housing is confined to the filter elements without any compression of them.

7 Claims, 1 Drawing Sheet

COMPRESSIBLE FILTER ELEMENT PERIPHERALLY SEALED BY A SETTABLE MATERIAL

BACKGROUND OF THE INVENTION

This invention relates to filters.

Depth filters, especially of the electrostatic type, rely on the depth of the filter material for their efficiency. Some filters have discs of different filter materials, such as with varying density, stacked one on top of another and sealed at their edge by clamping them between two halves of a housing. The problem with this is that clamping compresses the discs, thereby reducing their thickness in the region of their edge and reducing the efficiency of the filter in this region. Because the compressed area extends around the periphery of the discs, it can be a significant proportion of the filter area. To compensate for this, and to produce the desired throughput, it is necessary to increase the size of the filter, making it heavier and more bulky.

BRIEF SUMMARY OF THE INVENTION

It is an object of the present invention to provide an improved filter.

According to the present invention there is provided a filter comprising a housing and at least one porous, compressible filter member, the edge of the filter member being sealed around its outer edge in a settable material flowed into the filter member, and the settable material sealing and supporting the filter member in the housing without compression.

The filter may include a plurality of filter members arranged as a stack in series with one another, the edge of each filter member being sealed with one another around its outer edge in the settable material. The plurality of filter members may differ from one another in filtering properties. At least one filter member is preferably a depth filter. At least one filter member is preferably an electrostatic filter. The housing preferably has an annular recess, the settable material being located in and forming a seal with the recess. The settable material may be silicone rubber.

A depth filter in accordance with the present invention, will now be described, by way of example, with reference to the accompanying drawing.

DETAILED DESCRIPTION OF THE PREFERRED EMBODIMENT

Figure 1:
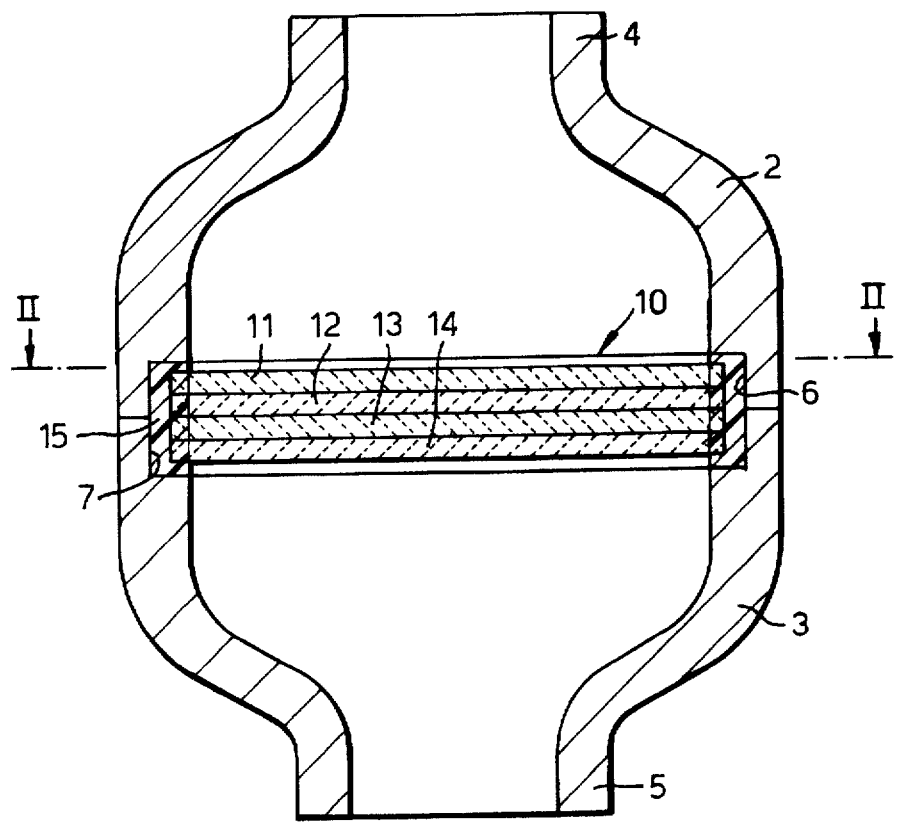
FIG. 1 is a sectional side elevation view through the filter.
Figure 2:
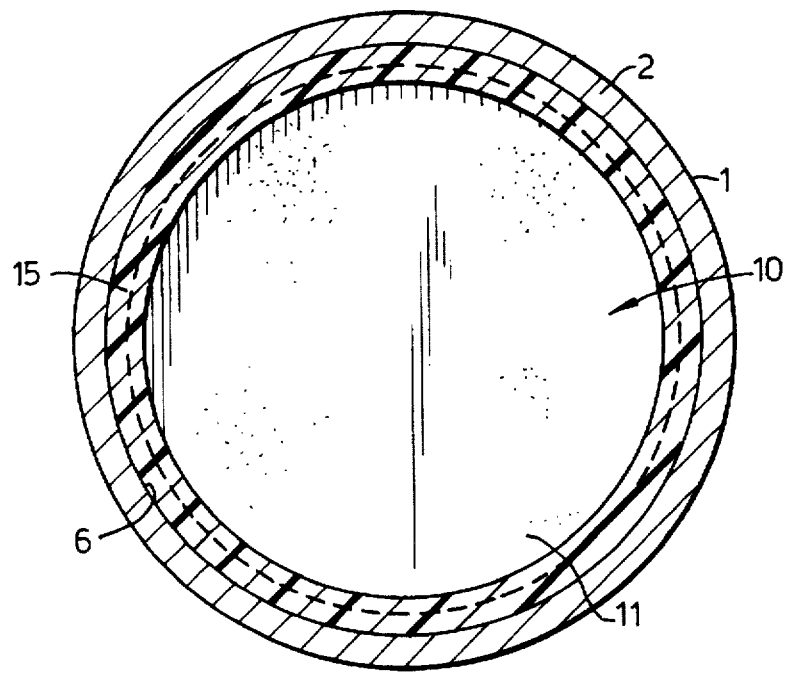
FIG. 2 is a transverse sectional view along the line II—II of FIG. 1.

The depth filter comprises a housing 1 formed in two halves 2 and 3 of a rigid plastics material. The housing 1 is of a circular section and tapers at opposite ends to an inlet port 4 and a outlet port 5.

Where the two halves 2 and 3 abut one another, they are each provided with a respective annular recess 6 and 7 around their inner surface to provide a single annular recess. The two halves 2 and 3 are joined together such as by welding or adhesive, or by means of cooperating screw threads.

Located within the annular recesses 6 and 7, between the two halves 2 and 3 of the housing 1, is a filter element 10. The element 10 includes a stack of four filter members or membranes 11 to 14 of a compressible, porous material. The material differs according to the substance being filtered and may be, for example, a woven fabric or paper material. The filter membranes 11 to 14 may differ one from the other in filtering properties, such as by pore size, so that the upstream membrane removes coarse particles, finer particles being removed by successive downstream membranes. The number of membranes also varies according to the application. The membranes 11 to 14 contact each other over their facing surfaces to provide support for one another.

The membranes are moulded around their edge into a peripheral, cylindrical collar 15 of silicone rubber. The exterior dimensions of the collar ensure that it is a close, sealing fit within the recesses 6 and 7 around the housing 1. The material of the collar 15 flows into the material of the membranes 11 to 14 during the moulding process so as to produce an effective seal and mechanical support around the edge of the membranes when set. Fluid flowing through the filter, between the inlet port 4 and outlet port 5 is confined to flow through each filter membrane 11 to 14 without the risk of any leakage around the edge. The entire surface of the membranes 11 to 14 is equally efficient right up to the inner edge of the collar 15, in contrast with previous depth filter where the membranes are retained at their edge by clamping and compressing.

The edge seal produced by the silicone rubber, or other settable material, could be used with a single filter member such as of foam. The edge seal reduces the risk of bacteria migrating between the housing and the edge of the filter member, which can otherwise be a problem, especially where the edge is cut and has irregular pore or cell sizes.

The filter could be used to filter gases or liquids.

What I claim is:

1. A filter comprising a housing; a filter element fabricated entirely of a compressible material and including at least one porous, compressible disc-shape filter member; a settable sealing material flowed into said filter element through its entire depth to seal a peripheral edge of said filter element, and wherein said settable material provides the entire seal and support of said filter element in said housing without compression of said edge of said filter element.

2. A filter according to claim 1, including a plurality of said filter members arranged as a stack in series with one another, and wherein the peripheral edge of each said filter member is sealed without compression to peripheral edges of the other filter members in said stack in said settable material.

3. A filter according to claim 2, wherein the plurality of said filter members differ from one another in filtering properties.

4. A filter according to claim 1, wherein the filter member is a depth filter.

5. A filter according to claim 1, wherein the filter member is an electrostatic filter.

6. A filter according to claim 1, wherein said settable material is silicone rubber.

7. A filter comprising: a housing having an inlet port and an outlet port; a filter element located between said inlet and outlet port, said filter element being entirely of a compressible material and including at least one porous, compressible disc-shape filter member; an annular recess extending around the interior of said housing; and a collar of a settable sealing material flowed into a peripheral edge of said filter element through its depth so as to seal the edge of said filter element, said collar being located in and sealing with said annular recess so that flow between said inlet and outlet port is confined through said filter element, said settable material providing the entire seal and support of said filter element in said housing without compression.

* * * * *